(12) United States Patent
Babian

(10) Patent No.: US 8,251,399 B2
(45) Date of Patent: Aug. 28, 2012

(54) INSTRUMENT PANEL ENERGY ABSORPTION SYSTEMS

(75) Inventor: Philip J. Babian, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 395 days.

(21) Appl. No.: 12/625,148

(22) Filed: Nov. 24, 2009

(65) Prior Publication Data
US 2011/0121550 A1 May 26, 2011

(51) Int. Cl.
*B60R 21/045* (2006.01)
(52) U.S. Cl. ............... 280/752; 296/187.05; 296/70; 296/37.12
(58) Field of Classification Search ............ 280/752, 280/751, 748; 296/187.05, 72, 70, 37.12; *B60R 21/045*
See application file for complete search history.

(56) References Cited

U.S. PATENT DOCUMENTS

| | | | |
|---|---|---|---|
| 5,096,223 A | 3/1992 | Tekelly | |
| 5,273,314 A | 12/1993 | Sakakibara | |
| 5,584,509 A | 12/1996 | Tekelly et al. | |
| 5,865,468 A | 2/1999 | Hur | |
| 6,299,208 B1 | 10/2001 | Kasahara et al. | |
| 6,866,294 B2 * | 3/2005 | Horsch et al. | 280/752 |
| 7,311,327 B2 | 12/2007 | Yamazaki | |
| 7,311,328 B2 | 12/2007 | Best et al. | |
| 7,484,792 B2 | 2/2009 | Penner | |
| 7,686,334 B2 * | 3/2010 | Schaupensteiner | 280/752 |
| 7,703,829 B2 * | 4/2010 | Miki | 296/72 |
| 7,735,865 B2 * | 6/2010 | Cappabianca et al. | 280/752 |
| 2007/0267857 A1 | 11/2007 | Jonsson | |
| 2009/0026799 A1 | 1/2009 | Gavrilov | |
| 2009/0134654 A1 | 5/2009 | Clashman et al. | |
| 2010/0295285 A1 * | 11/2010 | Dei et al. | 280/752 |

* cited by examiner

*Primary Examiner* — Paul N Dickson
*Assistant Examiner* — Keith Frisby
(74) *Attorney, Agent, or Firm* — Dinsmore & Shohl LLP

(57) ABSTRACT

Energy absorption systems are described herein. Energy absorption systems may include an instrument panel reinforcement extending from a passenger side to a driver side of a vehicle, a bracket secured to the instrument panel reinforcement including a body and a distal strike, and an instrument panel assembly including a passenger facing surface and a catch disposed on the instrument panel assembly, wherein when an impact force is applied to the passenger facing surface of the instrument panel assembly, the catch of instrument panel assembly may engage the strike of the bracket to absorb at least a portion of the impact force.

14 Claims, 4 Drawing Sheets

INSTRUMENT PANEL ENERGY ABSORPTION SYSTEMS

TECHNICAL FIELD

The present specification relates to instrument panel energy absorption systems for use in vehicles.

BACKGROUND

Vehicles generally contain instrument panels located in front of the driver's and passenger's seats. The instrument panel may contain a variety of components including HVAC accessories, airbags, glove box assemblies and the like. The instrument panel and components may generally be attached to an instrument panel reinforcement (IPR) such that the IPR supports both the instrument panel and the various components contained in the instrument panel. The IPR may also serve as an attachment point for various structural members, such as the steering column support bracket, the cowl bracket, and driver and passenger side braces.

In the event that the vehicle is involved in a collision, it is possible that a person seated in the vehicle, especially a person in the position nearest to and facing the instrument panel, will come into physical contact with the instrument panel. Accordingly, a need exists for energy absorption systems associated with the instrument panel and the IPR to absorb the energy of a passenger in the event of a collision.

SUMMARY

According to one embodiment, an energy absorption system may include an instrument panel reinforcement extending from a passenger side to a driver side of a vehicle, a bracket secured to the instrument panel reinforcement including a body and a distal strike, and an instrument panel assembly including a passenger facing surface and a catch disposed on the instrument panel assembly, wherein when an impact force is applied to the passenger facing surface of the instrument panel assembly, the catch of instrument panel assembly may engage the strike of the bracket to absorb at least a portion of the impact force.

In another embodiment, an energy absorption system may include an instrument panel reinforcement extending from a passenger side to a driver side of a vehicle, a bracket secured to the instrument panel reinforcement including a body and a distal strike, and an instrument panel assembly including a passenger facing surface and a catch disposed on the instrument panel assembly. Wherein, when an impact force is applied to the passenger facing surface of the instrument panel assembly, the catch of the instrument panel assembly may engage and may interlock with the strike of the bracket to absorb at least a portion of the impact force, such that the catch remains engaged with the strike during application of the impact force.

In yet another embodiment, an energy absorption system may include an instrument panel reinforcement extending to a passenger side of a vehicle, a bracket system including at least two brackets secured to the instrument panel reinforcement at a first and second lower leg intrusion locus, and an instrument panel assembly including a passenger facing surface and a catch system including at least two catches disposed on the instrument panel assembly and aligned in relation to the at least two brackets. Wherein, the catches of the instrument panel assembly may be disposed a distance from the at least two strikes of the bracket, and wherein when an impact force is applied to the passenger facing surface of the instrument panel assembly, the catches may traverse the distance, and may engage the strikes, such that the strikes deflect and deform to absorb at least a portion of the impact force.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
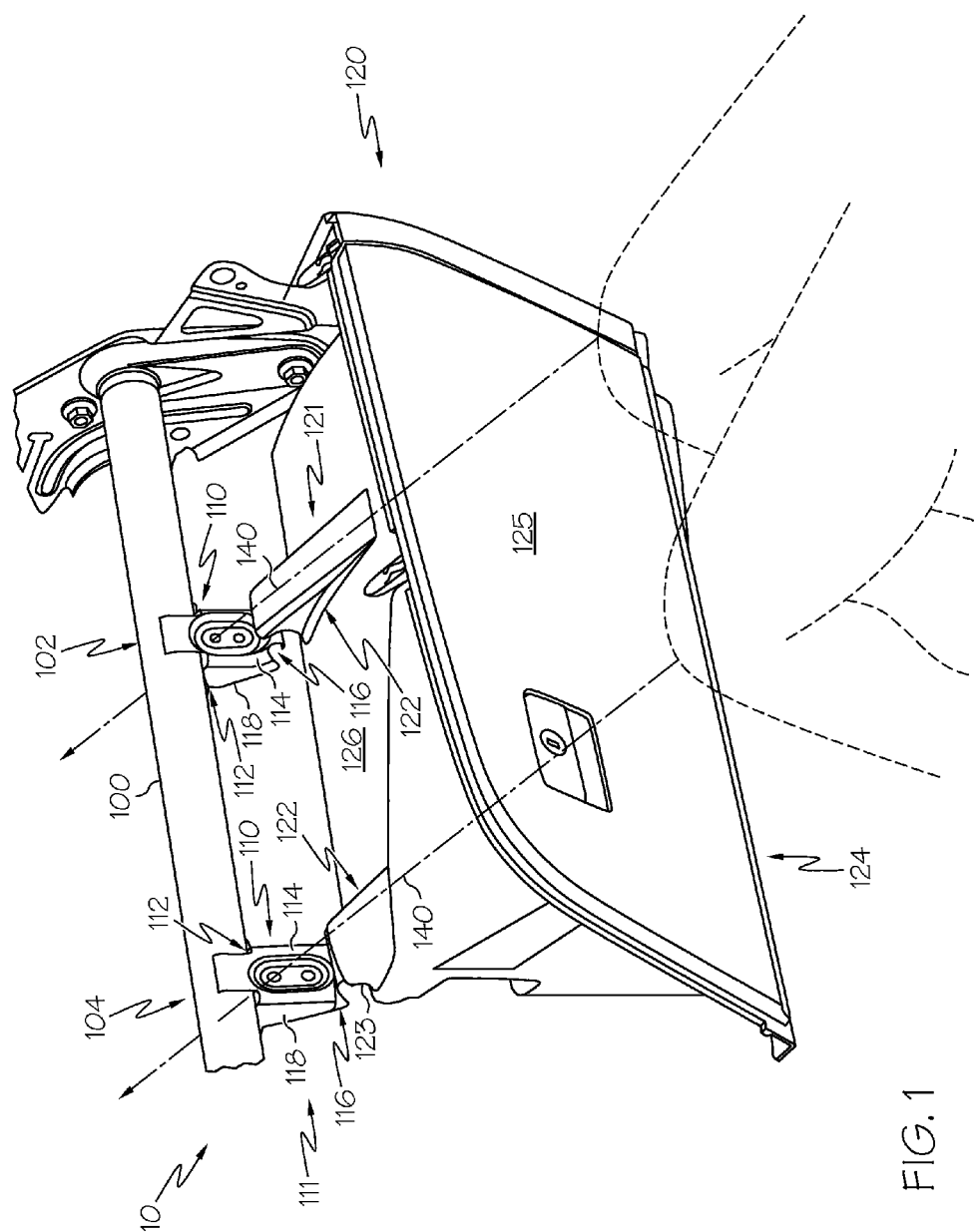
FIG. 1 depicts a front perspective view of an energy absorbing system according to one or more embodiments shown and described herein.
Figure 2:
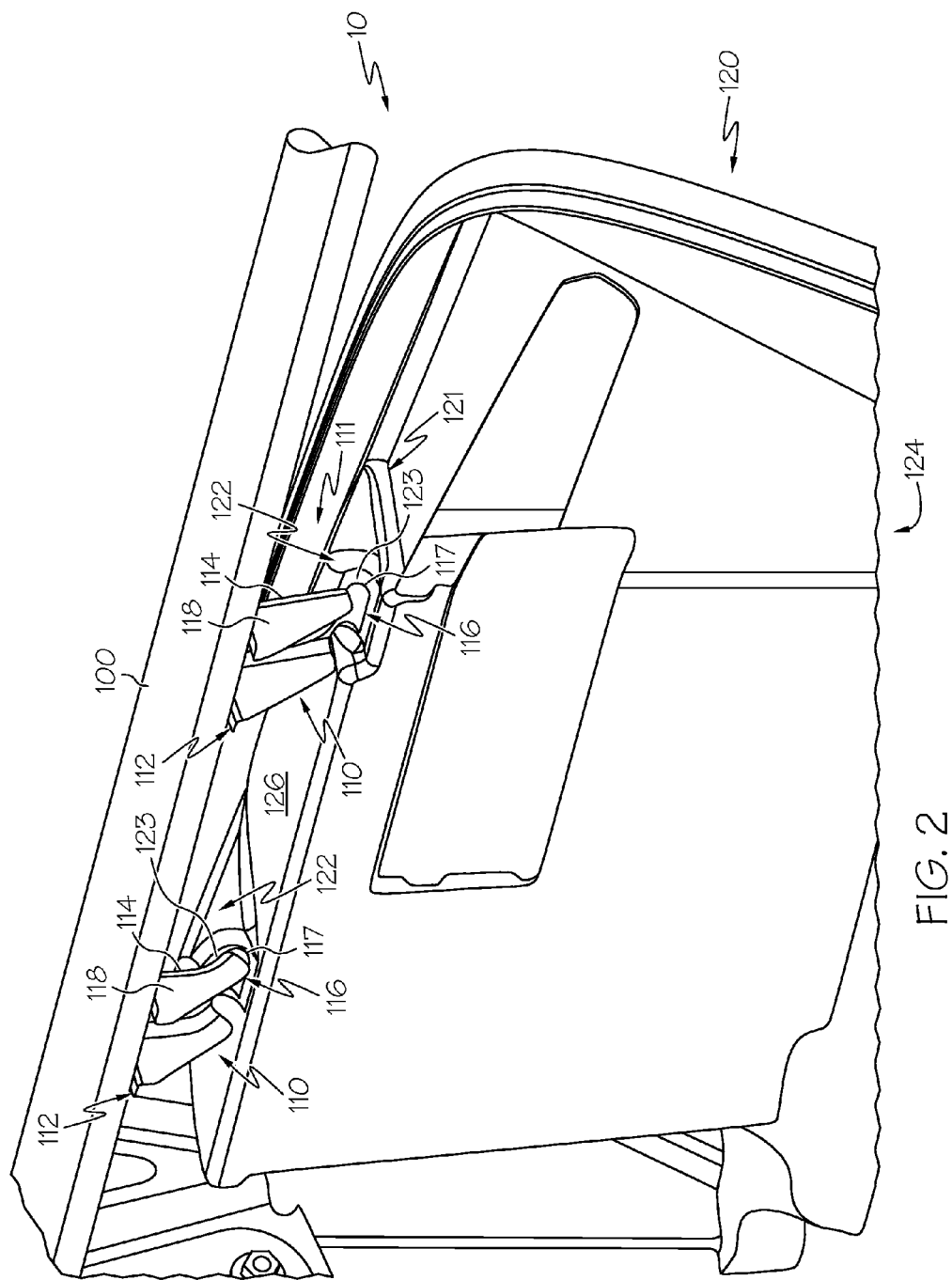
FIG. 2 depicts a rear perspective view of an energy absorbing system according to one or more embodiments shown and described herein.

The embodiments described herein generally relate to systems within a vehicle associated with the instrument panel for absorbing energy from a passenger coming into contact with the instrument panel in the event of a collision. The energy absorption systems generally include instrument panel reinforcements, energy absorbing brackets, and instrument panels or instrument panel assemblies. Energy absorption systems and related components will be described in more detail herein.

Referring to FIGS. 1-4, embodiments of energy absorption systems 10 are illustrated. An energy absorption system 10 generally comprises an instrument panel reinforcement (IPR) 100, an energy absorbing bracket 110 or bracket system 111, and an instrument panel or instrument panel assembly 120.

In the embodiments described herein, the IPR 100 can extend from the passenger side of the vehicle to the driver side of the vehicle and can comprise any metal, for example, steel. The IPR 100 can anchor a number of brackets and components associated with the instrument panel assembly (e.g., meters, gauges, audio and video accessories, HVAC accessories, airbags, glove box assemblies 120 and the like).

Figure 4:
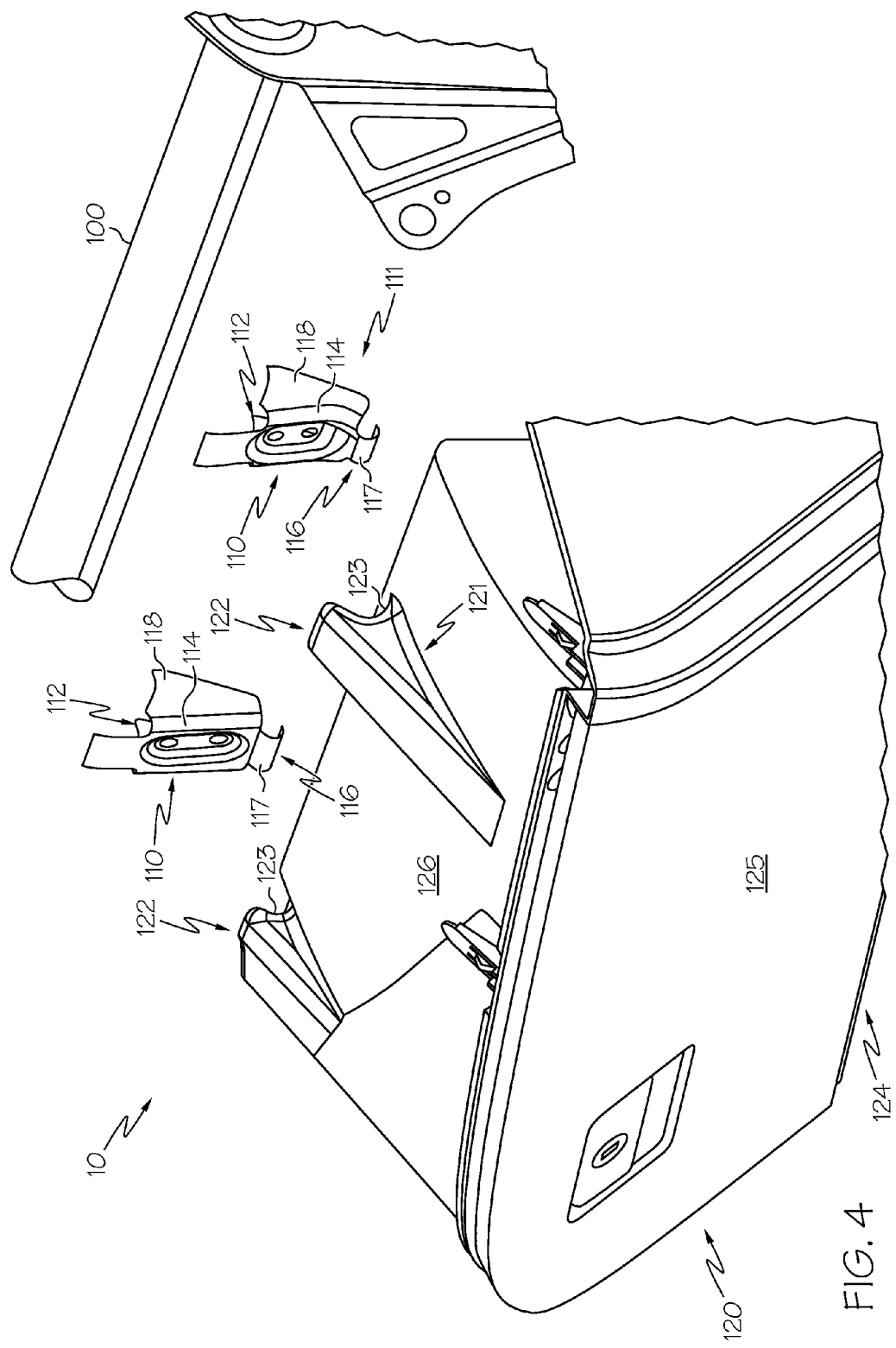
FIG. 4 depicts a perspective exploded view of an energy absorbing system according to one or more embodiments shown and described herein.

The instrument panel assembly 120 (illustrated in the figures as a glove box assembly) may comprise a catch 122 and a glove box 124. As best shown in FIG. 4, glove box 124 may include a top surface 126 with a catch system 121 disposed or positioned on the top surface 126. In one embodiment, as discussed later herein, catch(es) 122 can be aligned in relation to the bracket(s) 110 of bracket system 111. As illustrated in the figures, catch system 121 includes two catches 122, although embodiments described herein are not limited to any particular number of catches 122 within catch system 121. Glove box 124 also includes a passenger facing surface 125. Each catch 122 may be integrally molded into the glove box 124, or may be a separate component and secured thereto through a variety of methods. Catch 122 may be manufactured from any type of plastic, such as polypropylene, or other material.

As described later herein, each catch 122 of catch system 121 is configured to engage, interface or interlock with a strike 116 of bracket 110 such as at catch engagement surface 123. To accomplish such a function, catch 122 may comprise any number of shapes that provide for such engagement, interfacing or interlocking, including, but not limited to concave, "C" shaped, square shaped, or "V" shaped.

Still referring to FIGS. 1-4, two energy absorbing brackets 110 are illustrated (i.e., an energy absorbing bracket system 111). While two brackets 110 are illustrated throughout the drawings as making up bracket system 111 and may be useful for reasons discussed below, it should be understood that the systems described herein may be implemented with one bracket 110 within bracket system 111. Accordingly, as used herein, "bracket" can include one or more brackets 110 between the IPR 100 and the instrument panel assembly 120. In addition, as used herein, "bracket system" can include one or more brackets 110 between the IPR 100 and the instrument panel assembly 120.

Still referring to the drawings, the energy absorbing bracket(s) 110 may comprise a coupling arrangement 112 (best seen in FIGS. 1, 3 and 4), a body or body portion 114, and a distal strike 116. The coupling 112 can be securely attached to the IPR 100 through any mechanical means, such as, for example, a welded joint or a bolted joint. As illustrated, the body 114 links the coupling 112 to the strike 116. In one embodiment, the body 114 may comprise a strengthening flange 118. Additionally, the body 114 may extend downward to any desired location to link the coupling 112 to the strike 116 for flexibility in a passenger compartment design. The strike 116 may be configured to engage with the catch 122 (as described later herein) such as at strike engagement surface 117. Strike 116 may comprise any number of shapes, including, but not limited to convex, reverse "C" shaped, reverse square shaped, reverse "V" shaped (with "reverse" being in relation to catch 122), or any other shape that provides for engagement and interlocking with catch 122, as will be described in more detail herein. Furthermore, the energy absorbing bracket(s) 110 may be constructed out of any metal, such as, but not limited to steel. In one embodiment, the coupling 112 and the IPR 100 comprise the same metal.

It should be understood that, as used herein, the term "strike" means a surface contour configured to engage and interlock with a corresponding surface contour called a "catch." Similarly, the term "catch" means a surface contour configured to engage and interlock with a surface contour called a "strike." Hence, alternatively, the shape of the catch and strike may be reversed such that the catch includes a shape including, but not limited to convex, reverse "C" shaped, reverse square shaped, reverse "V" shaped (with "reverse" being in relation to strike). Also, as used herein, the terms "engage" and "interlock" mean to engage multiple surfaces in a manner such that once the strike 116 and catch 122 engage, they do not slip out of engagement during application of an impact force to the instrument panel assembly.

Figure 3:
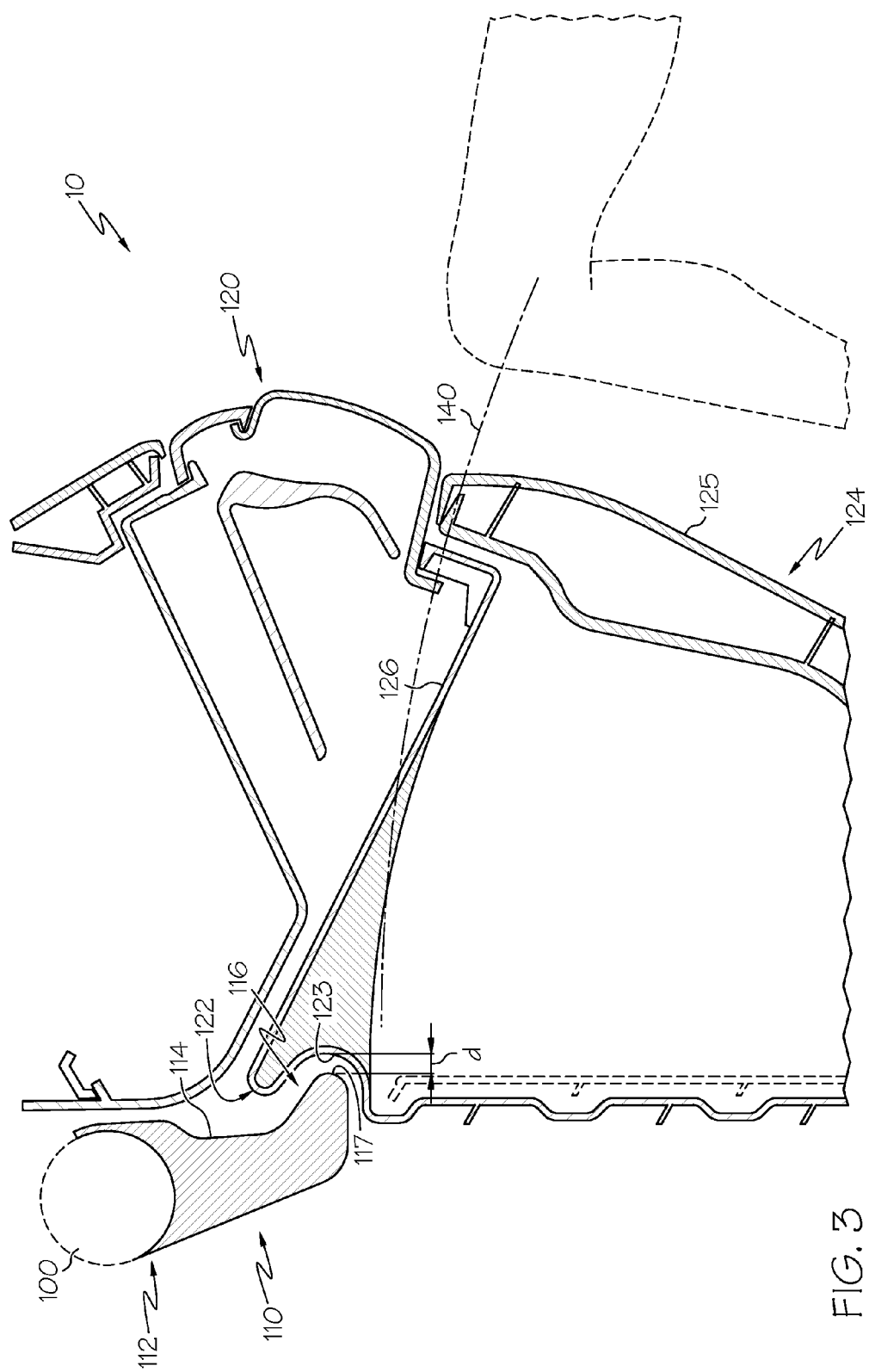
FIG. 3 depicts a cross-sectional view of an energy absorbing system according to one or more embodiments shown and described herein.

In one embodiment bracket 110 or bracket system 111 may be located according to one or more lower leg intrusion points (and one or more catches may be aligned in relation to the one or more brackets). Referring to FIG. 3, embodiments of the energy absorption system 10 may include brackets located according to a lower leg intrusion locus 140. The lower leg intrusion locus 140 may represent the path that the knees of a typical passenger may take during a collision. For example, the lower leg intrusion locus 140 may represent the knee travel path of an American Male 50$^{th}$ Percentile (hereinafter, AM50) crash test dummy located in a passenger seat during a front impact test. During such a crash test, the knees may travel in an arcing-motion as the legs rotate about the ankle towards the instrument panel assembly 120. As such, embodiments described herein may locate brackets 110 or bracket systems 111, such that the strike 116 and the catch 122 are located in a position along a lower leg intrusion locus 140. Such a location can result in controlled energy management despite the vertical offset between the lower leg intrusion locus 140 and the IPR 100, which commonly serves as the main energy absorption component in vehicles. Hence, referring to FIG. 1, an energy absorbing bracket 110 can be securely attached to the IPR 100 at a first knee position 102, and a second energy absorbing bracket 110 can be securely attached to the IPR 100 at a second knee position 104 (knee positions 102 and 104 representing a lower leg intrusion locus 140). By way of example, the first knee position 102 may be along the lower leg intrusion locus 140 and substantially in line with the first knee of an AM50 crash test dummy located in a passenger seat during a front impact test. Similarly, the second knee position 104 may be along the lower leg intrusion locus 140 and substantially in line with the second knee of the AM50 crash test dummy.

The energy absorption systems described above can be configured to dissipate a portion of the energy applied to the instrument panel assembly 120 (e.g., to passenger facing surface 125) upon impact force (e.g., the knees of a passenger resulting from a collision). With reference to FIG. 3, initially, the instrument panel assembly is located in a position such that the catch 122 is spaced at a distance d from the strike 116 in an unengaged position, where a smaller distance d may allow for a more instantaneous energy transfer. Furthermore, the distance d is dependent upon a vehicle specific tolerance stack-up, and may be any value, such as for example, less than or equal to about 5 mm. In another embodiment, the instrument panel assembly may be located in a position such that the catch 122 is in contact with the strike 116. When a sufficient impact energy or force is applied to the instrument panel assembly 120, the catch 122 (associated with the instrument panel assembly) traverses the distance d and is forced into an engagement position (FIG. 2) wherein it engages and interlocks with the strike 116 (associated with the IPR) at engagement surfaces (123 and 117). Such a traversal operates to absorb a portion of the impact energy or force.

Upon engagement, the strike 116 (and bracket 110) initially deflects such that a portion of the impact energy is transferred to the strike 116 (and bracket 110). The deflection may be elastic provided that the force operating on the beam remains sufficiently low. The deflection of the bracket 110 may be approximated by a beam bending equation of:

$$y = \frac{wL^3}{3EI}, \tag{1}$$

where y is the elastic deflection, w is the impact force, L is the length measured between the IPR and the point along the bracket 110 at which the catch transfers the impact force to the bracket 110, E is the modulus of elasticity and I is the area moment of inertia. For example, bracket 110 may be configured to include a steel body 114 that is 46 mm wide and 2 mm thick, and two steel flanges 118 that are 23 mm wide and 2 mm thick. Such a bracket 110 has an area moment of inertia of about $1.531 \times 10^{-8}$ m$^4$. Since steel has a modulus of elasticity of about 207 GPa, the bracket 110 deflects in a range of about 1 μm-1.3 μm (e.g., 1.12 μm) when a 1,000 N impact force is transferred from the instrument panel assembly 120 to a point along the bracket 110 that is 22 mm away from the IPR 100. However, if the impact force is great enough (i.e., much larger than 1,000 N) or if the bracket 110 includes an area of weakness (e.g., smaller thickness, smaller flanges, metal with different modulus of elasticity), deflections of the bracket 110 and strike 116 may be followed by or subsumed by deformations (e.g., bending, twisting, shearing, deflecting or wrapping around the strike 116). Ultimately, either by deflection or deformation, the impact force is transferred to the IPR 100. Hence, a portion of the impact force is dissipated by the mechanical deflection/deformation. As a result, the impact force applied to the instrument panel assembly is absorbed by the bracket and/or IPR.

It should now be understood that various embodiments of the energy absorbing system 10 may be incorporated into a vehicle to absorb energy in the event of a collision. Particularly, when embodiments of the energy absorbing system 10 described herein were subjected to crash testing with an AM50 crash dummy, femur loads remained below 8 kN. When embodiments of the energy absorbing system 10 described herein were subjected to crash testing with an AF05 crash dummy, femur loads remained below 6.4 kN.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An energy absorption system comprising:
   an instrument panel reinforcement extending from a passenger side to a driver side of a vehicle;
   a bracket secured to the instrument panel reinforcement comprising a body that extends downward from the instrument panel reinforcement;
   a distal strike that is offset downward from the instrument panel reinforcement and coupled to the body of the bracket, the distal strike comprising a catch engagement surface that is convex;
   an instrument panel assembly coupled to the instrument panel reinforcement, the instrument panel assembly comprising a glove box having a passenger facing surface and a top surface that is offset downward from the instrument panel reinforcement; and
   a catch disposed on the top surface of the glove box, the catch comprising a strike engagement surface that is concave,
   wherein when an impact force is applied to the passenger facing surface of the glove box, the glove box travels along a lower leg intrusion locus from an unengaged position to an engaged position, and wherein the catch engagement surface of the distal strike and the strike engagement surface of the catch are aligned along the lower leg intrusion locus and spaced a distance apart along the lower leg intrusion locus such that the catch only partially surrounds the strike, when the glove box is in the unengaged position, and the strike engagement surface of the catch engages the catch engagement surface of the distal strike to absorb at least a portion of the impact force, when the glove box is in the engaged position.

2. The energy absorption system of claim 1 wherein when the impact force is applied to the passenger facing surface of the glove box, the instrument panel reinforcement and the bracket are configured to deform in order to absorb at least a portion of the impact force.

3. The energy absorption system of claim 1 wherein when the impact force is applied to the passenger facing surface of the glove box, the catch is configured to deform in order to dissipate a portion of the impact energy.

4. The energy absorption system of claim 1 comprising a second strike and a second catch located along a second lower leg intrusion locus.

5. An energy absorption system comprising:
   an instrument panel reinforcement extending from a passenger side to a driver side of a vehicle;
   a bracket secured to the instrument panel reinforcement comprising a body that extends downward from the instrument panel reinforcement to a distal strike, wherein the distal strike comprises a catch engagement surface that is concave;
   an instrument panel assembly coupled to the instrument panel reinforcement, the instrument panel assembly comprising a glove box having a passenger facing surface and a top surface that is offset downward from the instrument panel reinforcement; and
   a catch disposed on the top surface of the glove box, the catch comprising a strike engagement surface that is convex,
   wherein when an impact force is applied to the passenger facing surface of the glove box, the glove box travels along a lower leg intrusion locus from an unengaged position to an engaged position, and wherein the catch engagement surface of the distal strike and the strike engagement surface of the catch are aligned along the lower leg intrusion locus and spaced a distance apart along the lower leg intrusion locus such that the strike only partially surrounds the catch, when the glove box is in the unengaged position, and the strike engagement surface of the catch engages and interlocks with the catch engagement surface of the distal strike of the bracket to absorb at least a portion of the impact force, such that the catch remains engaged with the strike during application of the impact force, when the glove box is in the engaged position.

6. The energy absorption system of claim 5 further comprising:
   a second bracket secured to the instrument panel reinforcement, wherein the bracket is disposed at a first lower leg intrusion locus and the second bracket is disposed at a second lower leg intrusion locus.

7. The energy absorption system of claim 6 wherein when an impact force is applied to the passenger facing surface of the glove box, the instrument panel reinforcement, the bracket and the second bracket are configured to deform in order to absorb at least a portion of the impact force.

8. The energy absorption system of claim 5 wherein when an impact force is applied to the passenger facing surface of the glove box, the catch is configured to deform in order to absorb at least a portion of the impact force.

9. An energy absorption system comprising:
   an instrument panel reinforcement extending to a passenger side of a vehicle,
   a bracket system having at least two brackets secured to the instrument panel reinforcement at a first and second lower leg intrusion locus and extending downward from the instrument panel reinforcement;

a strike system having at least two strikes, wherein each of the strikes is offset downward from the instrument panel reinforcement and coupled to one of the brackets, and wherein each of the strikes are convex;

an instrument panel assembly coupled to the instrument panel reinforcement, the instrument panel assembly comprising a glove box having a passenger facing surface and a top surface that is offset downward from the instrument panel reinforcement; and a catch system having at least two catches disposed on the top surface of the glove box and aligned in relation to the at least two brackets, wherein each of the catches are concave;

wherein the catches are disposed a distance from the strikes along the first and second lower leg intrusion locus such that each of the catches only partially surrounds the each of the strikes, and wherein when an impact force is applied to the passenger facing surface of the glove box, the catches traverse the distance, and engage the strikes, such that the strikes deflect and deform to absorb at least a portion of the impact force.

10. The energy absorption system of claim 9 wherein when an impact force is applied to the passenger facing surface of the glove box, the catches are configured to deflect and deform in order to absorb at least a portion of the impact force.

11. The energy absorption system of claim 10 wherein when an impact force is applied to the passenger facing surface of the glove box, the catches interlock with the strikes and remain engaged during application of the impact force.

12. The energy absorption system of claim 9 wherein the brackets are secured to the instrument panel reinforcement to prevent detachment of the brackets from the instrument panel reinforcement.

13. The energy absorption system of claim 12 wherein the brackets deflect in a range of about 1 μm to about 1.2 μm when a 1,000 N impact force is applied to the passenger facing surface.

14. The energy absorption system of claim 13 wherein the distance is ≦ about 5mm.

* * * * *